May 1, 1951 D. J. TRICEBOCK 2,550,736
METAL DETECTION APPARATUS
Filed July 15, 1949
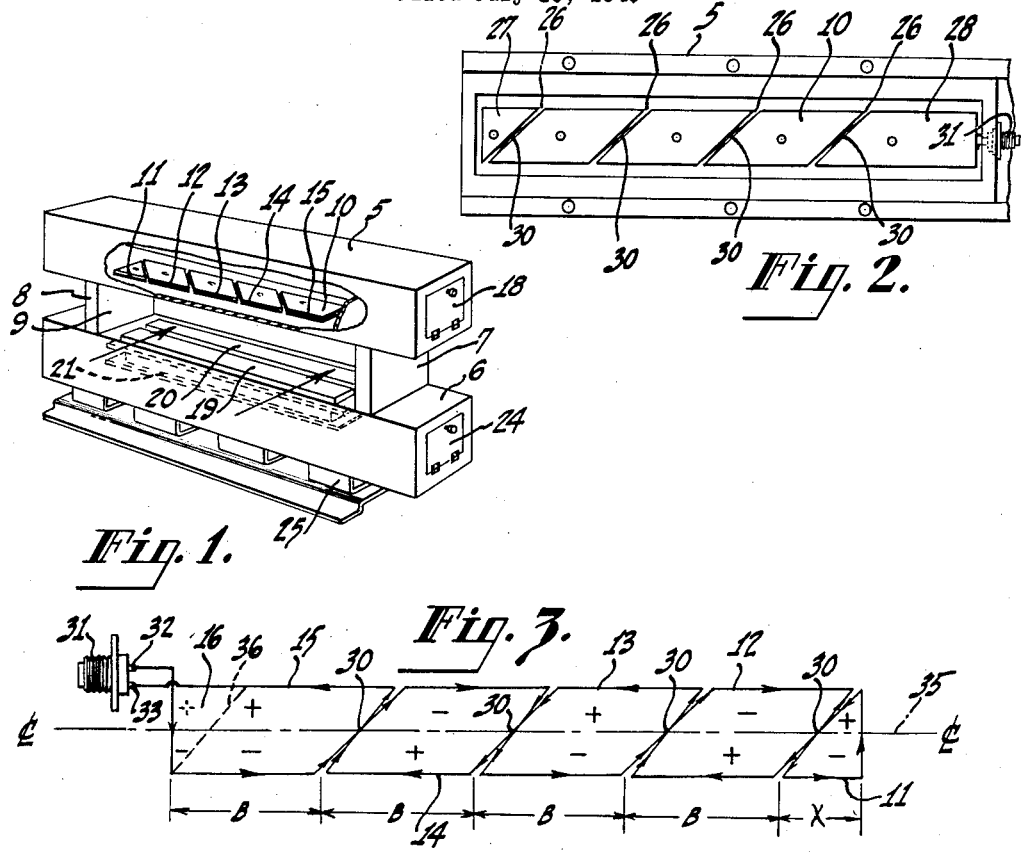
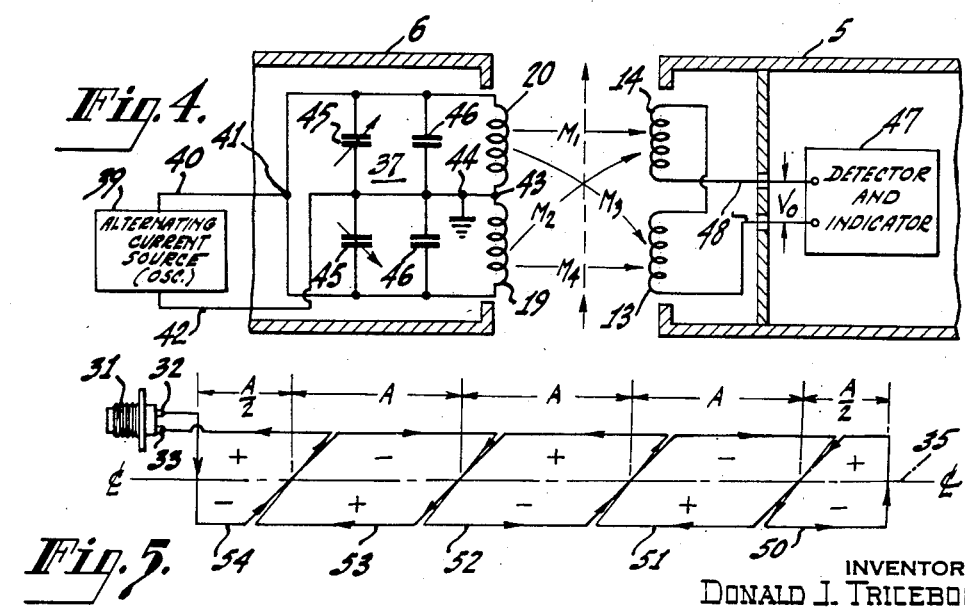
INVENTOR
DONALD J. TRICEBOCK
BY
ATTORNEY Patented May 1, 1951

2,550,736

UNITED STATES PATENT OFFICE 2,550,736

METAL DETECTION APPARATUS

Donald J. Tricebock, Philadelphia, Pa., assignor to Radio Corporation of America, a corporation of Delaware Application July 15, 1949, Serial No. 104,895

16 Claims. (Cl. 175—183)

1

The present invention relates to metal detection apparatus of the type having an inspection aperture or zone associated with a normally balanced inductive coupling system responsive to the presence of metal in said zone.

Apparatus of the type referred to, for example, is shown, described and claimed in a copending application of Ben R. Gossick for Metal Detection Apparatus, Serial No. 82,445, filed March 19, 1949, and assigned to the same assignee as this application, and is used extensively for detecting the presence of metal in various semi-conducting or non-conducting materials.

In the system above referred to, materials to be inspected are carried by suitable conveyor means through the inspection zone or aperture between oscillator and detector units arranged in spaced relation to each other. An alternating electromagnetic field is established in the aperture by the oscillator unit and is inductively linked with the detector unit through suitable cascade-type inductor or coil elements providing a normally balanced inductive coupling system which is highly sensitive to the presence of metal without being subject to certain other disadvantages commonly encountered in the use of such apparatus.

Any included metallic substance or object brought into or near the inspection zone causes distortion of the field between the coils because of the magnetic permeability of the substance or object, or if non-magnetic, because of the magnetic field produced by currents induced therein. The initial balanced condition, which is very critical, is thus disturbed by the metallic substance or object, and a resulting voltage output is utilized to actuate suitable detecting and/or indicating means.

In metal detection apparatus of the type having an inspection aperture for the detection of metallic substances and objects in electrically non-conducting and/or semi-conducting materials such as foods, textiles, tobacco products, plastics and the like, there are generally provided a pair of elongated primary inductors or coils, extending in substantially parallel relation across the width of the aperture at one side thereof, and connected with a source of high frequency or other suitable alternating current, such as provided by an oscillator or an R.-F. generator contained in the oscillator head or unit, either above or below the aperture. The coil connections are such that the two resultant elongated electromagnetic fields, in parallel relation, extending along the width of the aperture, are in polarity opposition.

The detector or secondary inductor or coil arrangement likewise extends across the width of the aperture in opposed spaced relation to the field establishing inductors, and is so adjusted

2 along the depth of the aperture, that is, in the direction of travel of the material, that it equally links the opposing flux from the generating or primary coil system, thereby being adjusted for balanced or null voltage output.

The detector coil is arranged in a plurality of sections along the transverse axis or width of the aperture, in a cascade inductor or coil system, providing substantially a cascade bridge which may more effectively be balanced for zero output or null in the detection output as described in the case referred to. The inductors of at least one coil unit comprising the inductive coupling system, are transposed from one side to the other of the center line or longitudinal axis of the coil unit. This axis or center-line extends laterally across the inspection zone or aperture, that is, at a right angle to the movement of the material through said inspection zone or aperture.

The sensitivity of a metal detector or like inspection apparatus to small disturbances of the magnetic field, depends primarily upon the perfection of the initial balance in the energy transfer between the coils, and the maintenance of high sensitivity under conditions of vibration and changes in temperature, normally encountered, requires a high degree of stability. This is provided to a high degree by the cascade coil system referred to.

It is an object of this invention, accordingly, to provide an improved coil system wherein the initial balance may remain constant and critical, and the apparatus may be made uniformly highly responsive to relatively small particles or objects having the property of magnetic permeability or electrical conductivity, that may pass through or near the inspection zone or aperture at any point along substantially its full width.

It is a further object of this invention, to provide an improved and highly sensitive metal detector system having an electromagnetic inspection aperture and associated inductor arrangement in which the sensitivity is substantially uniform throughout the entire width of the aperture and substantially unaffected by the presence of inspection material passed through the aperture or inspection zone and by stray electromagnetic fields from external sources.

In inspection apparatus of the type referred to, the effective width of the inspection aperture may be limited by the presence of surrounding and associated machine and structural elements. At the same time it is desired to inspect for metal over as great a width as possible. It is therefore, a still further object of this invention, to provide a detector coil system that is substantially immune to such disturbing influences and may have a greater ratio of useful length to physical length than any heretofore known.

In inspection apparatus of this kind, metallic plates must often be provided in close proximity to the ends of the detector or secondary coil system because of the need for shielding, and preferably should be removable for adjustment of the detector coil system. Accordingly, it is an object of this invention, to provide a secondary or detector coil system of the cascade type that is substantially insensitive to motion of symmetrical bodies or plates of metal near the ends of the coil system. This refers more particularly to motion toward and away from the coil ends along the axis of the coil.

In inspection apparatus of this kind, furthermore, it is also frequently found that different aperture heights are desirable for use in inspecting different materials. In practical cases, the lengths of the primary coils are approximately equal to the lengths of the secondary coils. This means that the extreme ends of the detector coil system are located in a non-uniform field due to the end effects of the primary coils.

In balanced coils known heretofore, having non-rectangular or pointed ends, the above condition may result in a residual net voltage output from the detector coil system, because the pointed ends of the coil are on opposite sides of the center line and are wound in opposite directions. Therefore, any change in field that affects both of these ends equally provides induced voltages which do not cancel out but rather are additive.

In accordance with the invention, however, with cascade-type square end coils, a change in the field strength at the ends results in voltages which are effectively cancelled out at each end individually. As the distance from the primary coils is changed, the area over which the non-uniform field exists is changed but the square ends serve effectively to produce a net voltage of zero in any case.

It is, therefore, a further object of this invention to provide metal detection apparatus having an inspection aperture and detector coil system associated therewith, wherein inductor or coil units of the cascade type in a plurality of flat sections and with rectangular or square ends, may be utilized and provided in a single size to operate satisfactorily over a relatively wide range of aperture heights and uniformly be sensitive through the full width of the aperture, in any case.

In accordance with the invention, the coil or inductor unit is flat, and the transposition of the inductors across the longitudinal center line provides a series of coil sections which may be of any suitable uneven number and of unequal length. For any two adjacent coil section, the error voltage may be considered to comprise the sum of two error voltages, one being induced in one section of the winding and the other being induced in the other section thereof. As the two sections are connected in opposition, the error voltage output becomes the difference rather than the sum of the two error voltages.

It can be seen, therefore, that the cascade inductor or coil system itself tends to be self-balancing so that when it is placed at the null position in the field of the metal detection apparatus, the residual voltage is reduced to a relatively low value, being the differential voltage rather than the sum voltage in the several coil sections.

Furthermore, the self-cancelling or balancing feature makes the errors in symmetry and errors in field components caused by dimensional tolerances and non-uniformity in the magnetizing coil system far less important and the null adjustment is substantially unaffected by any disturbance that affects all sections of the coil or inductor unit equally, such disturbances being temperature drift, vibration, and external fields.

Finally, as in many cases, the product being inspected may have an effect in itself on the metal detection apparatus, particularly certain foods, such as pickles or soups. If the material being inspected is arranged to pass equally under portions or sections of the improved cascade coil system of the present invention, then the signal voltage from the inspected material itself is reduced substantially to a minimum. This permits the inspection of some materials which would otherwise be impossible to inspect by metal detection methods.

In order that there may be no dead spots at the cross-over points, the coil sections are located in overlapping relation to each other in the direction of flow of the material. To this end the cross-over points or transposition connections are made at an angle to the axis of the coil other than 90 degrees, and in order to provide equal polarity areas on either side of the coil center line, the end connections have likewise been provided heretofore at a similar angle. However, the useful width of the usual cascade coil is limited by the tapered ends which operate in a weakened field due to the end-effect of the driving coil, as referred to. In the end regions of the inspection aperture the signal from a metallic substance or object, such as a metal particle, may be considerably lower than in the intermediate or central portion of the aperture, because the area of the detector coil affected, as well as the field strength, is reduced.

Merely squaring the ends of the detector coil or inductance does not solve the problem of increasing the uniformity of the field effect upon the detector coil, for the reason that due to the non-uniform field an unbalance in the differential output voltage from the coil sections is at once effected, which is a step in the wrong direction.

However, square ends can be achieved if in accordance with the invention, the end sections are made as quadrilaterals such that the area of each end is made equal to one-half the area of each of the intervening sections. Then with non-rectangular cross-over connections at intermediate points, the total overall voltage balance results in a substantially zero residual voltage output as will hereinafter appear. This is also coupled with the fact that an odd number of sections must be provided for obtaining this effect, as will be seen.

The coil sections therefore provide a series of areas in which all but the end two are parallelograms, while the end two are quadrilaterals such that the ends of the coil are square and the sides of the end section that lie adjacent to the next section are equal and parallel to that next side.

If a voltage induced around a coil section area is assigned an arbitrary polarity sign at any instant, the voltage induced in an adjacent area along the center line will have an opposite sign because the winding is in the opposite direction. The voltage induced in an adjacent area across the center line will also have the opposite sign because this area will be closer to the second primary coil and its net voltage will be determined primarily by the field of the second primary coil. It will therefore be seen that the flat coil sections assume parallelogram forms, with at least one of the end sections as a quadrilateral or trapezoid in form, in overlapping relation along a common center line.

With further multiplication of the coil sections, the balance in output may be obtained more easily and will tend to remain in adjustment. In any case, the error voltage output of a multiple-section cascade coil arrangement is the difference between the error voltages induced in the various areas of the coil sections, which must be an uneven number.

In one modification of the invention, the detector or secondary coil may be divided into a series of segments, sections or areas in which all but the end two are equal parallelograms. The two end sections or areas are quadrilaterals or trapezoids in form, such that the ends are square and the sides of the end sections that lie adjacent to the next section are equal and parallel to that next side, and the overall area of each end section is equal to one half the area of the intermediate parallelogram sections.

If, now, the voltage induced around each coil section area is assigned an arbitrary polarity sign at any instant as described above, then it can be seen that the summation of all of the induced voltages in the several sections or segments is zero, that is, may provide substantially zero differential output. Likewise, the summation of the induced voltages on either side of the longitudinal center line of the coil unit is substantially zero, and furthermore, the summation of the induced voltages on either side of any line parallel to the center line is also substantially zero, whereby the initial balancing for the desired operational null is facilitated.

In this type of coil, in order to eliminate dead spots in the inspection aperture or zone, the crossover connections are made at some angle other than 90 degrees, such as 45 degrees, for example, as in the prior cascade system referred to, and to make effective balancing possible, an odd number of sections are provided, together with rectangular or squared ends for the detector or secondary coil. This results in an elimination of pointed ends in the detector or secondary coil and an improvement in sensitivity at the extreme ends of the inspection aperture or zone, because of the increase in field area.

Furthermore, it makes it possible to use the same coil system, that is, the same driving or primary coils and the same detector or secondary coils, over a wide range of aperture heights, because the tapered ends are eliminated, and while the ends are wound in opposite directions and on opposite sides of the center line, the equal total voltages induced of one polarity are cancelled by equal total voltages of the opposite polarity and the result is an overall differential output voltage which normally is substantially zero.

Furthermore, any disturbing effect on the field caused by changing the position of metallic elements near the ends of the secondary or detector coil, particularly when such metallic elements are symmetrical with respect to the center line of the metal detection apparatus, may have no serious effect upon the present system, as when end plates or shields are removed to install coil adjusting elements and for inspection of the interior portions of the apparatus.

The improved coil system covered by the present invention retains all of the desirable features of prior cascade coil structures and in addition overcomes many of the disadvantages thereof as follows: (1) Because of the square end construction attained in the present detector or secondary inductor or coil, the sensitivity does not fall off as rapidly near the ends of the inspection aperture or zone, thereby resulting in a greater useful or operating width in the aperture for a given overall length of a balanced inductor or coil system. (2) Square or rectangular ends for the detector or secondary coil allow for substantially full unbalance voltage cancellation even though the field intensity may fall off as the ends of the aperture or inspection zone are approached. The effect of the weakened field is equal on both sides of the coil center line so the coil system remains in balance and therefore the same coils or inductors may be used for various aperture heights. (3) If a symmetrical piece of metallic material, such as an end plate, shield or cover for the apparatus, is placed in the field or removed from the field, the effect is the same on each side of the coil center line and the initial balance or null is not seriously disturbed, thus allowing means necessary for balancing operations to be installed in proper positions.

The novel features as above that are characteristic of this invention, are further set forth with particularity in the appended claims. The invention itself, however, both as to its organization and method of operation, as well as additional objects and advantages thereof, will further be understood from the following description, when read in connection with the accompanying drawings, in which:

Figure 1 is a view in perspective, on a greatly reduced scale and partly broken away, of a metal detector or inspection apparatus embodying the invention;

Figure 2 is a bottom view of the coil form and casing arrangement for one unit of the apparatus shown in Figure 1;

Figure 3 is a schematic winding diagram showing the manner in which an inductive winding is applied to the coil forms of Figures 1 and 2 in accordance with the invention;

Figure 4 is a schematic circuit diagram of the apparatus of Figure 1 illustrating a principle of operation of the invention; and Figure 5 is a further schematic winding diagram showing the configuration and arrangement of one of the inductor elements of the apparatus of Figure 1 and of the form shown in Figure 2, modified in accordance with the invention.

Referring to Figure 1, the metal detector of the present invention is shown as comprising two elongated, superposed inspection heads or containers 5 and 6, preferably of metal or other conducting and shielding material, rigidly spaced apart by insulating spacing blocks 7 and 8, to form an inspection aperture 9 defined at its sides by the blocks 7 and 8 and at the top and bottom by the lower and upper faces, respectively, of the inspection heads 5 and 6.

Material may be passed through the aperture in the direction of the arrows, or in the reverse direction, along the entire width of the aperture. The height of the aperture is determined by the spacing of the containers or inspection heads 5, 6 and the width is determined by the distance between the blocks 7, 8.

The electromagnetic field for inspection purposes is established within the aperture by suitable inductor means located in one of the heads, while the balanced output or detector inductor means is located in the other inspection head. In the present example, the detector inductance or coil arrangement is mounted in the upper container 5 on an elongated, transversely slotted insulating form 10, and comprises a series of winding sections 11—15 inclusive. The shielding compartment provided by the container 5 also includes associated detector apparatus (not shown) adapted to be adjusted and controlled through a door 18 at one end of the compartment.

The coil comprising sections 11—15 is rigidly mounted on the form 10, opposite an opening (not shown) in the lower face of the container or inspection head 5, substantially centrally of the inspection aperture 9 and extending laterally over a major portion of the width of the aperture.

The balanced electromagnetic field in the aperture 9 which links with the multiple-section, elongated coil 11—15 of the detector, may be provided by any suitable electromagnetic coil means, such as the two elongated coils or inductors 19 and 20 mounted in parallel, side-by-side relation to each other on suitable insulating forms 21.

The two coils 19 and 20 extend transversely, substantially from side to side, of the aperture, in order when energized with suitable alternating current, to provide as primary coils a uniform composite field throughout the aperture area linking with the detector or secondary coils 11—15 and are connected in opposed relation to provide parallel field portions of opposite polarity in the aperture.

The oscillator or R.-F. generator supply means for the primary inductors or coils 19—20 may be located in the lower container or head 6, and the controls and adjustments thereof may be made through a door 24 at one end of the container 6 as shown. The entire metal detector, as a unit, is mounted on suitable shock mounting base means indicated at 25, to reduce the transmission to the coil system of disturbing vibrations tending to cause dislocation of the coils and shifting of the output voltage from a predetermined minimum null adjustment. The material to be tested is passed through the inspection aperture and the electromagnetic field between the two sets of coils of the normally balanced inductive coupling system, which may be made highly sensitive and responsive to the presence of metal in any minute quantity in the material.

In the enlarged bottom view of casing 5, as shown in Figure 2, the shape of the coil form 10 is more clearly shown. It will be noted that the form is provided with a series of diagonal slots 26, dividing the elongated form into a series of parallelograms in the intermediate portion, a triangular portion 27 at one end and a quadrilateral section 28 at the opposite end, the area of section 28 being equal to the combined areas of one of the intermediate parallelogram forms and the end section 27.

The windings on the coil form appear at crossover points 30 in the slots, and the terminal ends of the winding are connected through an output plug connection 31. The winding arrangement is more clearly shown in Figure 3, to which attention is now directed, and in which the same reference numerals are used to designate like elements as in Figures 1 and 2.

The winding may be traced, as viewed in the drawing, from a terminal 32 on the plug connection 31, along one end of the coil section 15 and the lower edge thereof, thence through the first crossover point 30 in one slot and along the upper edge of section 14, thence through the second crossover point 30 to the lower side of the coil section 13, thence through the third crossover point 30 to the upper side of coil section 12, thence through the fourth and last crossover point 30 to the lower side of section 11, and along the other end of the coil form. From that point the winding continues through the fourth crossover point 30 and along the lower side of the coil section 12, through the third crossover point 30 and along the upper side of the coil section 13, thence through the second crossover point 30 to the lower side of the coil section 14, and continuing through the first crossover point 30 to the upper side of the winding section 15, thence to the other terminal 33 of the plug connection 31.

High frequency currents or differential output voltages for operating indicating apparatus are taken from the detector coil through the plug connector 31. The arrows on the single winding trace above referred to indicate an instantaneous current flow for one half cycle of the alternate current in the coil, as induced from the field of the metal detector or other source, and it should also be understood that the winding may continue in the same path to provide as many coil turns on the form as may be desired, to provide, in operation, sufficient pickup or sensitivity for the particular field of the generator windings. In the present example, the winding may be considered to have substantially twenty-two turns of insulated conductor.

It will be noted that the winding is substantially symmetrical about the longitudinal center line 35 of the coil form, and that the winding sections 12, 13 and 14 are equal parallelograms. The winding section 15 may likewise be considered as composed of a similar parallelogram, one side of which is defined by the dotted line 36 and a section 16 which is substantially equal to the section 11. All sections 12 to 15, inclusive, have equal lengths along the lower side, as viewed in the drawing, as indicated by the dimensions B, whereas the section 11 has a length X on the same side of the form, which is dependent upon the width of the coil and the angle of the crossover.

It will also be noted that the ends of the detector coil unit are square, as distinguished from prior coils having parallelogram or pointed ends. With this arrangement, the sensitivity of the coil at the ends is increased appreciably, as hereinbefore pointed out, and permits a single size coil to operate satisfactorily over a relatively wide range of aperture heights.

Further, in accordance with the invention, the transposition of the inductors across the longitudinal center line of the coil or inductor unit provides a series of coil sections which may be of any suitable uneven number and of unequal lengths. The total error voltage resulting from stray fields may be considered to comprise the sum of the individual coil section error voltages, the voltages induced in certain sections of the winding being in opposition to the voltages induced in other sections of the winding by reason of the transposed connections, whereby the error voltage output at the terminals 32 and 33 becomes the difference rather than the sum of the error voltages.

As in prior pickup or detector coil structures, in order that there may be no dead spot at the crossover points 30, the coil sections are located in overlapping relation to each other in the direction of the flow of the material to be inspected. To this end, the crossover points or transposition connections are made at an angle to the axis 35 of the coil other than 90 degrees, such as 45 degrees, for example, as shown.

With this arrangement, the field distortion cannot appear equally in two sections at the same time if a metal particle passes through the aperture of the detector. Effectively, the end conductor is interrupted to provide connections for the output current to the terminals 32—33. The interruption of the conductor is such that the end conductor provides a quadrilateral end section, that is, a square end for the coil, as shown in Figures 1, 2 and 3.

While other types of coil crossover or transposition means may be provided, the simple transverse crossover connection shown throughout Figures 1, 2 and 3 is at present preferred, since it involves merely placing the conductors in slots in the form, the slots being common to the crossover conductors extending in both directions.

Merely squaring the ends of the detector coil or inductance does not alone solve the problem of increasing the uniformity of the field effect on the detector coil, because the electromagnetic field provided in the primary inductor is non-uniform as a result of end-effect and, therefore, an unbalance in the differential output voltage from the coil sections is obtained unless an odd number of sections is provided, as shown in Fig. 3, in accordance with the invention. In one arrangement, one end section of the detector coil is in the form of a triangle, while the other end section is in the form of a trapezoid so arranged that the area of the trapezoid is equal to the sum of the areas of the triangular end section and one of the intermediate parallelogram sections. Thus the area included in each section on opposite sides of the center line may provide cancellation voltages that are equal and opposite in the overall winding. In any case, however, the coil sections provide a series of areas in which all but the end two are parallelograms, while the end two are of such configuration that the ends of the coil are square and the sides of the end section that lie adjacent to the next section are equal and parallel to the next side at the crossover points.

If, now, voltages induced around the various coil section areas on each side of the center line 35, as a result of their coupling with the two oppositely-connected primary inductors, are assigned arbitrary polarity signs at any instant, for example, as with the current flow indicated in Figure 3, it will be seen that voltages induced in adjacent areas along the center line 35 have opposite signs, because the windings are in opposite directions, and that, likewise, the voltages induced in adjacent areas across the center line 35 also have opposite signs because these areas are each closer to different primary coils and their net voltages are determined primarily by the field of the closer primary coil.

The error voltage output of a multiple-section cascade coil arrangement, as shown in Figure 3, is always the algebraic sum of voltages induced in the various areas of the coil sections.

From an inspection of Figure 3, it will be seen that, if the lengths B are equal, then the resulting overall induced voltage in the detector coil from a uniform field will be substantially zero between the terminals 32 and 33, as is desired.

The action of the alternating current field of the primary windings 19 and 20 on the detector coil may be considered further by reference to Figure 4, in which the coil sections 13 and 14 are shown arbitrarily, by way of example, in mutual inductive coupling relation with the coils 19 an 20. In Figure 4, a simplified circuit diagram of the effective coil system of the apparatus of Figure 1 is shown, with the aperture vertical and the detector coil arrangement shifted 90 degrees for greater convenience in considering the circuits, and like elements thereof are designated by the same reference characters as in Figure 1.

The field generating inductors 19—20 are connected with an oscillator or R.-F. generator 36, providing an energizing source of alternating current which may have a frequency of the order of 60 kc. for example. This is connected, through the medium of a tuning network 37, with the inductors or field coils 19—20 which are parallel-connected in opposition. One supply lead 40 for the generator is connected with one terminal 41 of the network, while the opposite supply lead 42 is connected with a terminal 43 having a ground connection indicated at 44.

By this arrangement, the inductors 19 and 20 are connected with the alternating current source in balanced relation, in opposition. Tuning capacitors 45 and 46 are provided in the network for tuning the inductances and circuit for better response at the supply or oscillator frequency.

Opposite the coils 19 and 20, across the aperture 9, there is provided the multiple-section detector coil or inductor represented by two of the sections 13 and 14, for example, oriented substantially 90 degrees from their actual position, as shown in Figure 1, for the purpose of simplified representation in the circuit diagram. It should be understood, however, that, as shown in Figure 1, the common axis of the detector or secondary coil 11—15 (Figures 1 and 3) is transverse of the aperture, while the field generating or primary coils 19 and 20 are spaced along the operating axis of the aperture, from front to rear, in side-by-side relation, whereby the fields of the coils 19 and 20 are successively traversed by the material passed through the aperture. The longitudinal axes, however, of both the field generating and detecting coils are substantially parallel and extend transversely of the inspection aperture, and are shown in their operating relation in Figure 1.

With the foregoing arrangement, the detector or secondary coil sections are inductively coupled to the primary coils. It will be seen that substantially balanced mutual coupling is obtained between the primary coil or inductor 19 and each of the sections 13 and 14 of the secondary or detector coil, as represented by the lines $M_2$ and $M_4$, respectively. Likewise, mutual coupling between the primary coil or inductor 20 and each of the sections 13 and 14 of the secondary or detector coil is represented by the lines $M_1$ and $M_3$, respectively. The inductors are adjusted until a minimum output voltage $V_0$ is applied to detector and indicator apparatus 47 through output leads 48.

The mutual inductances $M_1$ and $M_2$, and likewise $M_3$ and $M_4$, are equal and opposite in signs to provide a relatively sharp null point of adjustment for the minimum output voltage $V_0$, and this arrangement includes providing substantially identical primary or field generating coils.

It will be noted that the cascade coil system of Figure 3 comprises five coil sections or elements, all of which are serially connected. In this manner the error voltage output of each two-section cascade coil element is the difference between the error voltages induced in the two sections, and likewise the error voltage output of the two-section units of the coil is the difference between the error voltages induced in the two units, so that the overall voltage is the difference rather than the sum of the various error voltages in the coil sections 11—15 inclusive.

If the two-section detector or secondary coil 13—14 in Figures 3 and 4 occupied the same area in the form of a coil of one section, it could be considered that the error voltage output $V_0$, across the leads 48, could consist of the sum of two voltages, one being induced in one half of the coil and the other being inducted in the other half of the coil. Now, when the same area is occupied by a coil as shown, with two halves connected in opposition by transposing the coil conductors from side to side at a crossover point along the length of the coil, as shown at 30 (Figure 3) and as indicated in Figure 4, the error voltage output becomes the difference, rather than the sum, of the two voltages mentioned above. Thus all of the factors tending to produce an error voltage in the detector or secondary coil output, which are common to both halves 13—14 of the coil, are cancelled.

This not only applies to errors in symmetry and errors in field components caused by non-uniformity in the magnetizing or primary coil system, but also applies to the error signals produced by material being inspected for the presence of metal contamination. The path of the material through the aperture is generally indicated by the arrowed dotted line in Figure 4 and by the arrowed lines in Figure 1. In the case of metal contamination in uniform material being inspected, it is desirable for approximately equal amounts of the material to pass under the two sections 13 and 14, or any two opposed sections, of the detector or secondary coil for best cancellation and substantially zero output voltage. It should further be noted that this type of coil also tends to reduce the effect of spurious signals induced by stray fields from any exterior source, as hereinbefore mentioned.

In the coil system of Figure 3 it will be seen that the summation of all of the instantaneous voltages for all of the coil sections is zero, by reason of the fact that an odd number of sections is provided in series opposed relation, and that, with the exception of the end sections, all are equal parallelograms arranged in overlapping relation to each other in a direction normal to the longitudinal axis of the coil.

A further improved winding arrangement, having an odd number of coil sections, may be provided as shown in Figure 5, to which attention is now directed. It will be noted that the coil system comprises two end sections 50 and 54 which are equal trapezoids. The coil system further includes three intermediate, equal parallelogram sections 51, 52 and 53, connected serially with the end sections 50 and 54 and with the terminals 32 and 33 of the plug connector 31, as in Figure 3.

For an instantaneous flow of current through the detector coil, as shown by the arrows, arbitrary polarities may be assigned to the various sections on each side of the center line 35. If the parallelogram sections are each made of equal length A, measured along the center line, and the square-ended trapezoidal sections 50 and 54 are each made of a length A/2, measured also along the center line, then not only will the summation of all voltages induced in the various sections be zero, but also it will be evident that the summation of the voltages on either side of the center line 35 will be zero, and further, it will be evident that the summation of all voltages on either side of any line parallel with the center line 35 will be zero. This arrangement, therefore, provides for easier and better balancing of the output of the detector coil in operation for the desired null in the absence of any metal contamination, because the detector coil may be properly balanced for a null even though it is not located exactly on the center line of the electromagnetic field, as might be caused, for example, by tolerance variations in the mechanical assembly. At the same time, advantage is taken of the cascade coil construction in multiple sections for obtaining substantial immunity from outside interference and stray fields.

From the foregoing consideration of both Figures 3 and 5, it will be seen that a detector coil for metal detection apparatus and the like may, in accordance with the invention, include a series of cascade-connected coil sections arranged symmetrically along a common center line and having square ends. This desirable construction is permitted by having, in accordance with the invention, not only equal parallelogram sections intermediate of the end sections, but also having end sections which are trapezoids, and preferably equal. Furthermore, the crossover connections and the forming of the coil sections are provided through the use of a slotted, elongated, rectangular coil form, the slots being set at an angle to the axis of the form.

With respect to the modification of the invention shown in Figure 5, it will be seen that the detector or secondary coil of a metal detection apparatus may be divided into a series of segments, sections or areas in which all but the end two are substantially equal parallelograms. The two end sections or areas are substantially equal trapezoids, such that the ends are square and the sides of such end sections, that is, the crossover connections that lie adjacent to the next section, are equal and substantially parallel. The overall area of each end section is then substantially equal to one-half the area of one of the intermediate parallelogram sections.

With further multiplication of the coil sections to any odd number, the balance in the output may be obtained more easily and will tend to remain in adjustment. In any case, the error voltage output of a multiple-section cascade coil arrangement is the difference between the error voltages induced in the various areas of the coil sections which, in accordance with the present invention, must be an uneven number.

Finally, it should be noted that the transposition of the conductors is made with respect to the center line of the detector coil and that the crossover or transposition is uniform and equal on opposite sides thereof. With this arrangement, the length of conductor exposed to the field on one side of the center line is the same as the length of conductor exposed to the field on the opposite side and the entire structure comprises a non-rectangular parallelogram, or a series of non-rectangular parallelograms and end trapezoids or quadrilaterals, composed of transposed, substantially parallel conductors effectively providing a series of inductance elements extending along the axis and serially connected in cascade.

The transposition of the several coil conductor elements is made with respect to an axial center line for the coil in such a manner that the sum of all of the areas on one side of the center line, or any line parallel to the center line, of the coil system that are wound in a clockwise direction, plus the sum of all of the areas on the other side of the center line or other line parallel to the center line, that are wound in a counterclockwise direction, is equal to the sum of all of the areas on said one side of the center line, or line parallel to the center line, that are wound in a counterclockwise direction, plus the sum of all of the areas on the other side of the center line, or other line parallel with the center line, that are wound in a clockwise direction.

Furthermore, the transposition of the several detector coil conductor elements is made in such a manner that the sum of all of the areas on one side of any line parallel to the center line of the coil system that are wound in a counterclockwise direction is equal to the sum of all of the areas on the same side of the said line that are wound in a clockwise direction.

It will also be noted that all of the various coil sections are wound on a coil form in such a manner that they lie substantially in a single plane, as is desirable for use in a metal detector of the electromagnetic type having an inspection zone or aperture. With this arrangement, the detector coil may extend along one dimension of the inspection zone, preferably along the top or the bottom thereof, to link with the field set up by the primary windings directly across the inspection zone.

The cascade bridge system of the present invention provides a metal detection apparatus which may have a relatively high degree of sensitivity arising from the fact that two or more sections of the cascade inductor are wound in opposite directions by transposition of the conductors, so that in a uniform A.-C. field the voltage induced in one of the sections tends to cancel the voltage induced in the other section.

The main advantages are as follows: (1) The cascade system tends to be self-balancing so that, when adjusted for a null position, or zero output, in the field of the detection apparatus, the residual voltage is reduced to substantially a minimum low value. (2) The self-cancelling feature makes dimensional tolerance variations of the inspection head and other portions of the apparatus constituting the inspection aperture of far less importance than in known inspection apparatus of this type. (3) The adjustment is unaffected by any disturbances that affect both halves of the secondary coil or inductor equally, such disturbances being temperature drift, vibration, and external fields. (4) In many cases the product being inspected has an effect on a metal inspection apparatus, particularly if the material is semi-conducting. Accordingly, the apparatus of the present invention is arranged so that the material being inspected passes equally under each half of the secondary coil or inductor and the signal voltage from the material is thereby reduced by a very large factor and permits the inspection of some materials which would otherwise be impossible to inspect with a metal detector of the electromagnetic type. (5) The square ends provide improved sensitivity near the coil ends and a greater useful aperture length for a given overall length of coil, and thus allow the detection of small metal particles even though the particles are near the ends of the coil system or aperture. (6) The square ends insure that introduction or removal of symmetrically situated metal along the prolongation of the center line of the detector coil system does not upset the balance of the metal detector because such symmetrically located metal will affect both sides of the detector coil equally, and thus be self-cancelling. (7) The square ends allow the use of the same size detector coil system at different distances from the field coils, that is, with various aperture heights, because the non-uniformity due to end effects of the field coils affects both sides of the detector coil equally, and, therefore, is self-cancelling.

What is claimed is:

1. In a metal detection apparatus, the combination with primary coil means providing an alternating current electromagnetic inspection field, of secondary coil means inductively coupled therewith and oriented with respect thereto for the detection of metal in said field, said secondary coil means comprising an elongated inductance coil having substantially parallel conductors transposed alternately from side to side of said coil across the longitudinal axis thereof at predetermined intervals and at angles other than a right angle with respect to said axis, and said coil having end conductors extending across said longitudinal axis substantially at a right angle thereto, whereby square ends are provided for said coil means with a series of cascade-bridge coil sections therebetween in end-to-end relation along said axis and the number of sections being an odd number, for effecting improved balance and sensitivity in said apparatus.

2. In a metal detection apparatus, the combination as defined in claim 1, wherein the end sections of said elongated inductance coil are trapezoidal in form, and the intermediate sections are of parallelogram form.

3. In a metal detection apparatus, the combination as defined in claim 1, wherein the end sections of the elongated inductance coil are trapezoidal in form and equal, and the intermediate sections are in the form of equal parallelograms.

4. Metal detection apparatus comprising in combination, means providing an inspection zone for the passage of materials to be inspected, primary inductance coil means providing an electromagnetic field in said zone, and an elongated secondary inductance coil means extending along and substantially to the ends of said zone in inductive coupling relation with said first-named coil means, said secondary coil means having square ends and having an odd number of coil sections connected effectively in balanced series cascade relation, with the conductors thereof transposed from side to side at intervals along the length thereof between said sections, the area of each end section being equal to one-half the area of each of the intermediate sections, and providing equal areas on opposite sides of the longitudinal center line of said secondary coil means.

5. Metal detection apparatus as defined in cialm 4, wherein the end sections of the secondary coil means are equal trapezoids and the intermediate sections thereof are equal parallelograms.

6. A detector coil for a metal detection apparatus of the electromagnetic type, having square ends and comprising an odd number of flat coil sections extending along a common longitudinal axis in a common plane, the coil sections comprising a continuous conductive winding transposed from side to side of said coil between said sections and at angles with respect to the longitudinal axis other than a right angle, whereby a series of substantially equal parallelogram areas are included within the intermediate sections and substantially equal trapezoidal areas are included within the end sections of the coil.

7. An elongated detector coil for a metal detector of the electromagnetic type, having square ends and comprising an odd number of flat coil sections extending along a common longitudinal axis in a common plane, and providing a series of intermediate non-rectangular parallelogram areas along and on opposite sides of said axis between substantially equal trapezoidal end sections, and all sections being cascade connected effectively in balanced series relation to provide a differential voltage output.

8. In a metal detection apparatus having an inspection zone and a pair of primary inductors extending along one boundary of said zone and being connected in opposition to provide a composite electromagnetic field in said zone, a secondary inductor providing an indicator voltage source extending along an opposite boundary of said zone in substantially equal inductive coupling relation with each of said first-named inductors, said secondary inductor comprising a winding transposed from side to side at intervals along the axial length thereof to provide an odd number of coil sections effectively wound clockwise and counterclockwise in series cascade relation end-to-end, the transposition of the winding being at angles other than a right angle, and the ends of the secondary inductor being substantially square.

9. Metal detection apparatus as defined in claim 8, wherein the transposition of the winding with respect to the longitudinal axis of the secondary inductor is such that the sum of all of the areas of the clockwise-wound sections on one side of the said axis or any line parallel thereto, plus the sum of all of the areas of the counterclockwise-wound sections on the opposite side of said axis or said line, is equal to the sum of all of the areas of the counterclockwise-wound sections on the first-named side of said axis or said line, plus the sum of all of the areas of the clockwise-wound sections on said opposite side of said axis or line.

10. In a metal detection apparatus having an inspection zone and a pair of primary inductors extending along one boundary of said zone and being connected in opposition to provide a composite electromagnetic field in said zone, a secondary inductor providing an indicator voltage source extending along an opposite boundary of said zone in substantially equal inductive coupling relation with each of said first-named inductors, said secondary inductor comprising a winding transposed from side to side at intervals along the axial length thereof to provide an odd number of coil sections effectively wound clockwise and counterclockwise in series cascade relation end-to-end, the transposition of the winding being at angles other than a right angle, the intermediate sections being in parallelogram form and the end sections being equal trapezoids in form, and the area of each end section being equal to one-half the area of one of the intermediate sections, and the ends of the secondary inductor being substantially square.

11. Metal detection apparatus as defined in claim 10, wherein the transposition of the winding with respect to the longitudinal axis of the secondary inductor is such that the sum of all of the areas of the clockwise-wound sections on one side of said axis is equal to the sum of all of the areas of the counterclockwise-wound sections on the same side of said axis.

12. Metal detection apparatus as defined in claim 10, wherein the transposition of the winding with respect to the longitudinal axis of the secondary inductor is such that the sum of all of the areas of the counterclockwise-wound sections on one side of any line parallel to the longitudinal axis is equal to the sum of all of the areas of the clockwise-wound sections on the same side of said line.

13. A detector coil for a metal detector of the electromagnetic type, comprising a series of flat coil sections extending along a common longitudinal axis and substantially in a common plane, the end coil sections having substantially square ends and the winding of said coil sections being transposed from side to side of said coil between said sections substantially at equal intervals along said axis and equally on opposite sides thereof, providing a series of substantially equal intermediate coil field areas along and on opposite sides of said axis between substantially equal end coil field areas, and equal opposed polarity areas on opposite sides of said axis or any line parallel thereto, said winding further being transposed at an angle to said axis other than a right angle whereby intermediate sections provide a series of overlapping non-rectangular parallelograms, and means providing an electrical output connection for said coil sections in series opposition, thereby to derive a resultant differential voltage therefrom, and the number of coil sections being an odd number, whereby said detector coil may be balanced in operation while maintaining full sensitivity throughout its length by reason of the square ends.

14. In a metal detection apparatus, an elongated flat detector coil having substantially parallel conductors transposed alternately from side to side of said coil across the longitudinal axis thereof at predetermined intervals and at angles other than a right angle with respect to said axis, and said coil having end conductors extending across said longitudinal axis substantially at a right angle thereto, whereby square ends are provided for said coil with a series of cascade-bridge coil sections therebetween in end-to-end relation along said axis, the number of sections being an odd number, for effecting improved balance and sensitivity in said apparatus, and the intermediate sections being in the form of equal parallelograms, and at least one of the end sections being in the form of a trapezoid.

15. In metal detection apparatus, the combination with means providing a metal detection zone having a predetermined width, of a balanced inductive coupling system including spaced inductor elements responsive to the presence of metal in said zone to provide a predetermined differential output voltage, one of said inductor elements being a flat coil unit extending transversely of said zone substantially the width thereof and terminating in square ends, said unit including an odd number of cascaded coil sections effectively connected in series opposition alternately, as the source of said output voltage, whereby said differential output voltage is the difference in error voltage output of the several coil sections.

16. In metal detection apparatus, the combination as defined in claim 14, wherein the several coil sections are provided by a winding having transposed connections between said sections extending substantially equally on either side of an axial line across the width of said zone.

DONALD J. TRICEBOCK.

REFERENCES CITED

The following references are of record in the file of this patent:

UNITED STATES PATENTS

| Number | Name | Date |
|---|---|---|
| 1,992,013 | Palueff | Feb. 19, 1935 |
| 2,124,579 | Knerr et al. | July 26, 1938 |
| 2,237,254 | Broekhuysen | Apr. 1, 1941 |
| 2,467,306 | Habig | Apr. 12, 1949 |
| 2,489,920 | Michel | Nov. 29, 1949 |